(12) United States Patent
Savarese et al.

(10) Patent No.: US 9,073,711 B2
(45) Date of Patent: Jul. 7, 2015

(54) APPARATUS FOR DISPENSING MATERIAL

(75) Inventors: Mark Savarese, Hood River, OR (US);
Jeffery J. Williams, The Dalles, OR (US)

(73) Assignee: Columbia PhytoTechnology LLC, The Dalles, OR (US)

( * ) Notice: Subject to any disclaimer, the term of this patent is extended or adjusted under 35 U.S.C. 154(b) by 170 days.

(21) Appl. No.: 13/420,294

(22) Filed: Mar. 14, 2012

(65) Prior Publication Data

US 2012/0233874 A1 Sep. 20, 2012

Related U.S. Application Data

(60) Provisional application No. 61/453,483, filed on Mar. 16, 2011.

(51) Int. Cl.
*G01F 11/00* (2006.01)
*B65G 65/48* (2006.01)
*F26B 25/00* (2006.01)
*F26B 1/00* (2006.01)
*F26B 3/30* (2006.01)
*F26B 17/04* (2006.01)

(52) U.S. Cl.
CPC ............. *B65G 65/4881* (2013.01); *F26B 1/005* (2013.01); *F26B 3/30* (2013.01); *F26B 17/04* (2013.01); *F26B 25/002* (2013.01)

(58) Field of Classification Search
CPC   B65G 65/4881; B65G 65/4836; F26B 1/005; B65D 88/68; B01F 13/1041
USPC ......... 222/225–227, 236, 238, 254, 271–272, 222/352, 181.1, 189.02–189.11, 146.2; 241/277, 280, 283; 366/155.1–155.2, 366/326.1; 406/62–69, 135
See application file for complete search history.

(56) References Cited

U.S. PATENT DOCUMENTS

| | | | | |
|---|---|---|---|---|
| 23,981 | A * | 5/1859 | Learned | 222/227 |
| 319,311 | A * | 6/1885 | Peters | 366/155.1 |
| 384,568 | A * | 6/1888 | Evans | 366/171.1 |
| 465,815 | A * | 12/1891 | Claus | 118/308 |
| 720,128 | A * | 2/1903 | Gheen | 222/221 |
| 773,818 | A * | 11/1904 | Smith | 366/155.1 |
| 840,686 | A * | 1/1907 | Brook | 366/179.1 |
| 854,165 | A * | 5/1907 | Hodge | 222/227 |
| 1,062,766 | A * | 5/1913 | Carter | 222/227 |
| 1,413,345 | A * | 4/1922 | Morris | 366/155.2 |
| 1,433,724 | A * | 10/1922 | Hughes | 241/92 |
| 1,469,635 | A * | 10/1923 | Feasler | 222/227 |
| 1,546,411 | A * | 7/1925 | Short | 222/486 |
| 1,557,106 | A * | 10/1925 | Tow | 406/69 |

(Continued)

OTHER PUBLICATIONS

International Search Report on Patentability and Written Opinion for International Patent Application No. PCT/US2012/029283, The International Bureau of WIPO, Geneva, Switzerland, mailed Jun. 20, 2012, 10 pgs.

*Primary Examiner* — Paul R Durand
*Assistant Examiner* — Randall Gruby
(74) *Attorney, Agent, or Firm* — Klarquist Sparkman, LLP

(57) ABSTRACT

An apparatus for dispensing material includes an outlet opening with a perforated cover. A rotatable applicator dispenses material through the perforated cover and may include brushes that sweep across and penetrate the openings of the perforated cover. The housing may also contain a feed roller for regulating the flow of the material and one or more commutators for fractionating the material.

32 Claims, 7 Drawing Sheets

(56) References Cited

U.S. PATENT DOCUMENTS

| | | | | | |
|---|---|---|---|---|---|
| 1,739,149 | A | * | 12/1929 | Heim | 366/155.1 |
| 1,872,028 | A | * | 8/1932 | Collins | 239/654 |
| 2,089,215 | A | * | 8/1937 | Lomax | 99/495 |
| 2,097,102 | A | * | 10/1937 | Moore | 222/625 |
| 2,098,246 | A | * | 11/1937 | Jarrier | 198/582 |
| 2,200,757 | A | * | 5/1940 | Miller | 222/145.6 |
| 2,248,700 | A | * | 7/1941 | Finnell | 222/238 |
| 2,301,589 | A | * | 11/1942 | Gillard | 34/236 |
| 2,498,833 | A | * | 2/1950 | Weyer | 239/668 |
| 2,551,853 | A | * | 5/1951 | Schill | 366/343 |
| 2,593,516 | A | * | 4/1952 | Alley et al. | 222/238 |
| 2,713,442 | A | * | 7/1955 | McFarling et al. | 222/238 |
| 2,782,963 | A | | 2/1957 | Erdmenger | |
| 3,131,911 | A | * | 5/1964 | Geerlings | 366/142 |
| 3,145,882 | A | * | 8/1964 | Quackenbush | 222/227 |
| 3,149,760 | A | * | 9/1964 | Eichorn et al. | 222/238 |
| 3,223,288 | A | * | 12/1965 | Hans | 406/67 |
| 3,280,973 | A | * | 10/1966 | Cartwright et al. | 209/233 |
| 3,529,870 | A | | 9/1970 | Woten | |
| 3,776,430 | A | | 12/1973 | Grandrud | |
| 4,037,759 | A | * | 7/1977 | Grosse-Scharmann et al. | 222/142 |
| 4,111,493 | A | * | 9/1978 | Sperber | 406/64 |
| 4,236,654 | A | * | 12/1980 | Mello | 222/238 |
| 4,411,390 | A | * | 10/1983 | Woten | 241/98 |
| 4,465,239 | A | * | 8/1984 | Woten | 241/98 |
| 4,492,321 | A | * | 1/1985 | Zoltner | 222/410 |
| 4,498,635 | A | | 2/1985 | Fielding | |
| 4,595,128 | A | | 6/1986 | Fielding | |
| 4,631,837 | A | * | 12/1986 | Magoon | 34/353 |
| 4,896,615 | A | * | 1/1990 | Hood et al. | 111/177 |
| 4,978,252 | A | * | 12/1990 | Sperber | 406/64 |
| 5,135,122 | A | | 8/1992 | Gross et al. | |
| 5,188,262 | A | | 2/1993 | Fielding | |
| 5,307,952 | A | | 5/1994 | Worrel et al. | |
| 5,469,971 | A | * | 11/1995 | Chilton et al. | 209/235 |
| 5,516,011 | A | | 5/1996 | Fielding | |
| 5,829,649 | A | * | 11/1998 | Horton | 222/636 |
| 6,109,488 | A | * | 8/2000 | Horton | 222/636 |
| 6,113,968 | A | | 9/2000 | McGuire et al. | |
| 6,119,624 | A | * | 9/2000 | Morikawa et al. | 118/13 |
| 6,161,784 | A | * | 12/2000 | Horton | 239/654 |
| 6,539,645 | B2 | | 4/2003 | Savarese | |
| 2009/0169694 | A1 | | 7/2009 | Fleisch et al. | |
| 2010/0021603 | A1 | | 1/2010 | Madsen et al. | |
| 2010/0264243 | A1 | * | 10/2010 | Blickley et al. | 241/280 |

* cited by examiner

APPARATUS FOR DISPENSING MATERIAL

CROSS REFERENCE TO RELATED APPLICATION

This application claims the benefit of U.S. Provisional Application No. 61/453,483, filed Mar. 16, 2011, which is incorporated by reference herein in its entirety.

FIELD

The present disclosure concerns embodiments of an apparatus for dispensing material, such as for dispensing a food product onto a food dryer.

BACKGROUND

U.S. Pat. No. 6,539,645 discloses a drying apparatus for drying products which are in the form of liquids or semi-liquids such as colloidal suspensions and the like. The drying apparatus disclosed in the '645 patent comprises a conveyor belt and a plurality of radiant heat sources, such as infrared heaters, that remove moisture from product being conveyed along the conveyor belt. Drying efficiency and the consistency at which product can be dried depend in large part on the ability to apply an even and consistent layer of product having a predetermined thickness onto the conveyor surface. When drying product that contains relatively large pieces of material and/or material that tends to agglomerate or adhere together when handled, such as fruit pulp, it is sometimes difficult to dispense product in a manner that applies an even and consistent layer of material onto the conveyor surface. Accordingly, there is a need for an improved dispensing apparatus, such as can be used to dispense product onto a conveyor surface for drying.

SUMMARY

According to one embodiment, an apparatus for dispensing material includes a housing with inlet and outlet openings and a path extending from the inlet opening to the outlet opening through which material to be dispensed travels. A stationary perforated cover at least partially covers the outlet opening, and a rotatable applicator within the housing dispenses material through the perforated cover.

According to another embodiment, material is introduced into a dispensing apparatus comprising a housing. Material is dispensed through a perforated cover of the housing by a rotating applicator that brushes the material against the perforated cover.

According to another embodiment, a system for drying material includes a dispensing apparatus comprising a housing with inlet and outlet openings, a rotatable applicator within the housing, and a perforated cover on the outlet opening. The dispensing apparatus dispenses material through the perforated cover. A conveying apparatus receives material dispensed from the dispensing apparatus, and a drying apparatus removes moisture from the material on the conveying apparatus.

According to another embodiment, an apparatus for dispensing material comprises a housing comprising inlet and outlet openings and a flow path extending from the inlet opening to the outlet opening through which material to be dispensed travels. Additionally, a stationary screen at least partially covers the outlet opening. Additionally, a rotatable applicator within the housing and comprising a plurality of brushes, each with a plurality of flexible bristles, is configured and positioned to sweep material across and to dispense material through the screen. At least a portion of the bristles can extend through openings in the screen when the applicator is rotated relative to the screen, and at least a portion of bristles that extend through the screen comprise end portions that can extend past the screen. Additionally, the housing also comprises a feed roller, for regulating the amount of material flowing through the housing, and a rotatable commutator, below the feed roller, and above the applicator, for fractionating the material. Additionally, the housing can comprise an upper housing portion and a lower housing portion as parts of the housing. The upper housing portion can define the inlet opening, and the lower housing portion can define the outlet opening. A transfer opening can be defined between the internal space of the upper housing portion and the internal space of the lower housing portion. The transfer opening desirably is positioned at or near the lower end of the upper housing and opens into the lower housing. The flow path extends from the inlet opening through the transfer opening and to the outlet opening.

DETAILED DESCRIPTION

The present disclosure concerns embodiments of an apparatus for dispensing material. The disclosed embodiments are particularly suited for dispensing product containing relatively large pieces of material and/or a moist material that tend to agglomerate or adhere together, such as fruit or vegetable pulp, onto a conveyor belt or similar device for further processing. For example, the disclosed embodiments are particularly suited to apply a layer of moist material having a predetermined thickness onto the conveyor belt of a drying apparatus that dries the material. However, it will be appreciated that the disclosed embodiments can be used to handle and dispense other types of material, including liquids, colloidal suspensions, solutions, paste, granular material, powders, and combinations thereof. The apparatus is particularly suited for dispensing fruit and vegetable pulps and pieces of fruit, vegetables, and plant matter. Some specific examples of material that can be handled and dispensed with the apparatus include carrot pulp, apple pulp, citrus pulp (e.g., lemon, orange, etc.), and plant material, such as leaves or roots.

Figure 1:
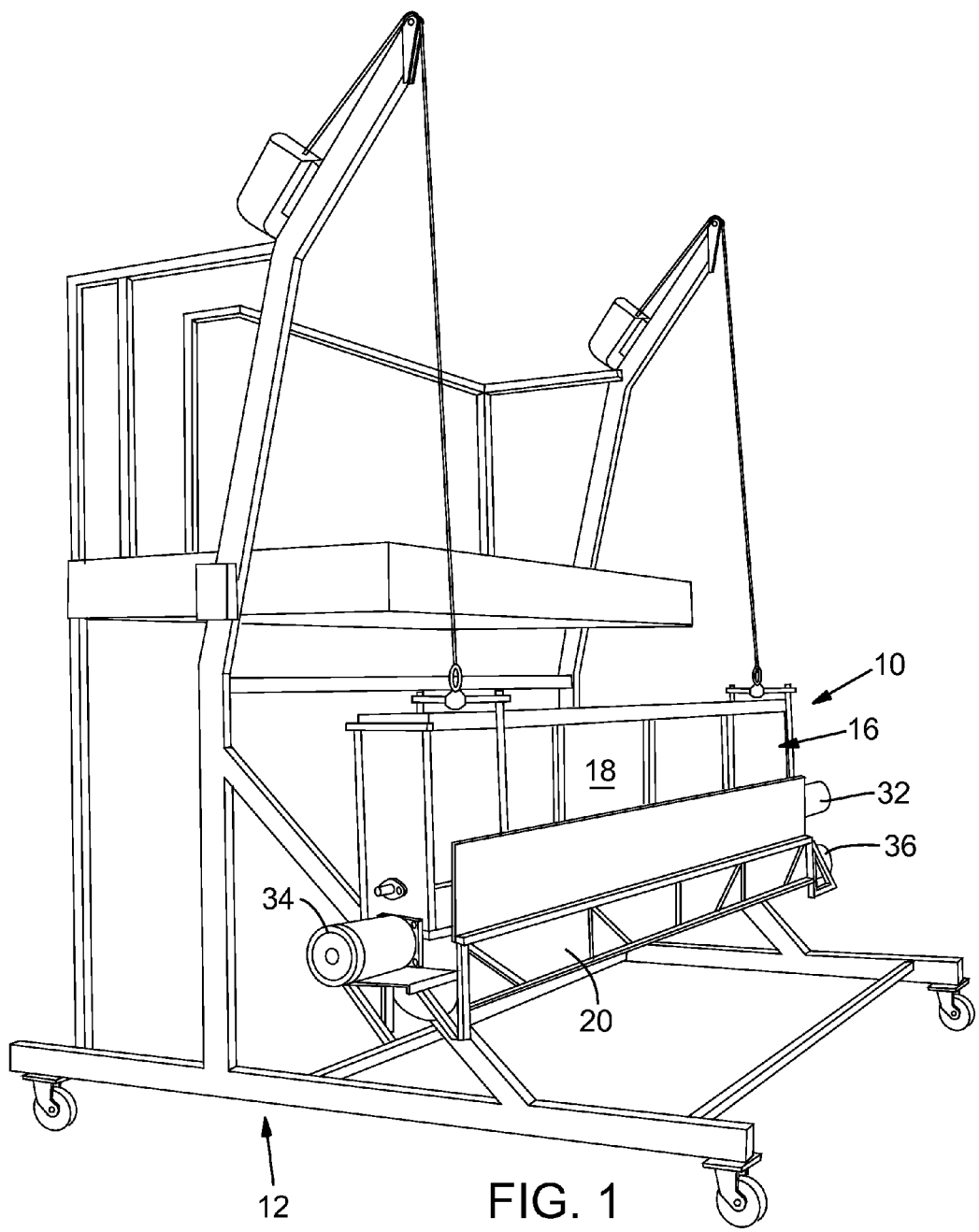
FIG. 1 is a front perspective view of a dispensing apparatus supported on a hoist device, according to one embodiment.

FIG. 1 shows a dispensing apparatus 10, according to one embodiment. The dispensing apparatus 10 is shown supported by a hoist device 12, which can be used to support the dispensing apparatus at a particular location for use or storage. For example, the hoist device 12 can be used to support the dispensing apparatus above the conveyor of a drying apparatus that dries material dispensed from the dispensing apparatus onto the conveyor.

Figure 2:
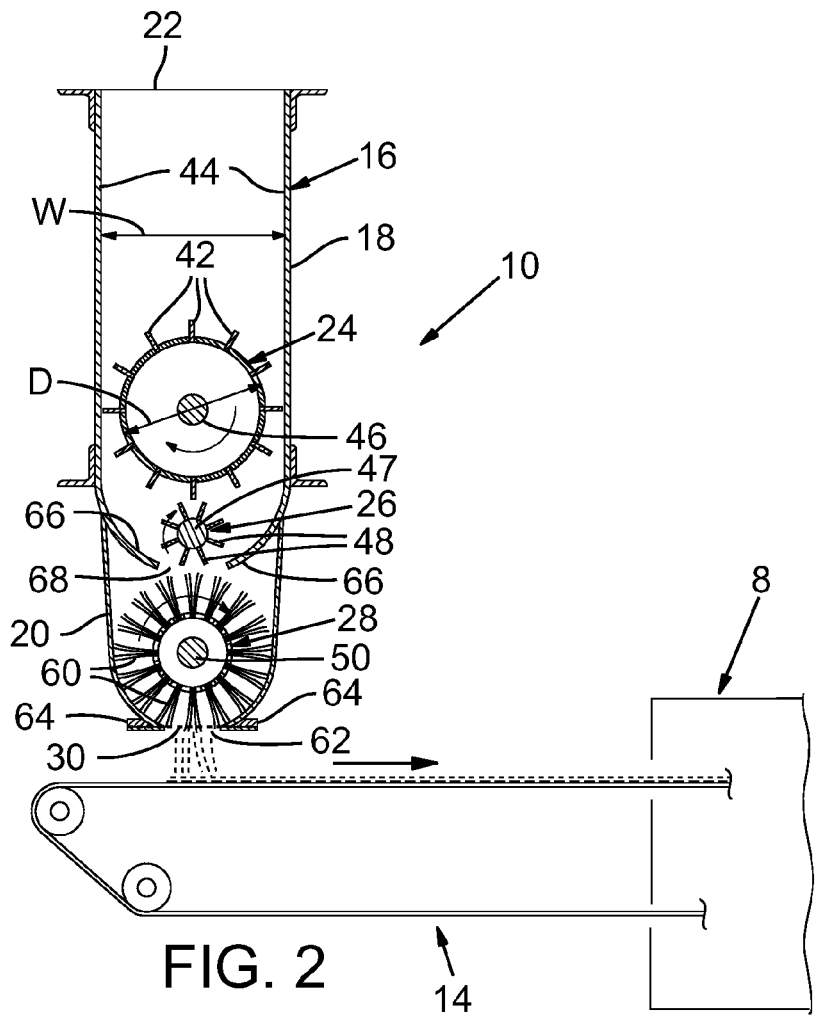
FIG. 2 is a cross-sectional view of the dispensing apparatus of FIG. 1.

FIG. 2 is a schematic, cross-sectional view of the dispensing apparatus 10 supported above a conveyor 14 of a drying apparatus 8. The conveyor 14 can be, for example, the conveyor of a drying apparatus that utilizes infrared radiant heat sources to remove moisture from material being conveyed through the drying apparatus. The drying apparatus 8 can also be used to sterilize material, such as plant leaves or roots. Such a drying apparatus is disclosed in U.S. Pat. No. 6,539,645, which is incorporated herein by reference. The dispensing apparatus 10 includes a housing 16, which can include an upper housing portion 18 and a lower housing portion 20. The upper and lower housing portions may be physically joinable and separable components, or they may be portions of one contiguous housing component, in which case the two portions are demarcated as the sub-volume of the housing above rotatable applicator 28 and the sub-volume containing the applicator 28. The top of the housing 16 includes an inlet opening 22 for introducing material into the dispensing apparatus. For example, material to be dispensed onto the conveyor 14 (e.g., fruit pulp) can be fed from an auger or pumped from a storage container into the upper housing portion 18.

In an embodiment, the upper housing portion 18 may house rotating components such as a feed roller 24 and a commutator, or agitator, 26 mounted below the feed roller 24. The feed roller 24 compartmentalizes, regulates the flow of, and displaces material through the dispensing apparatus, while the commutator 26 assists in fractionating or breaking up material that tends to agglomerate as it is pushed through the dispensing apparatus by the feed roller.

In an embodiment, the material moves along a path through the housing 16 extending from the inlet opening 22 to the outlet opening 62 as shown in FIG. 2. In an embodiment, the housing 16 and the path are more nearly vertical than horizontal, and material moves from a higher position at the inlet opening to a lower position at the outlet opening.

The concept of a cross-section may be used to define an area in a plane roughly perpendicular to the flow path. At each location along the path, there is a housing cross-section defining an area across the interior of the housing 16, 18, or 20 at that height, the plane of the housing cross-section being more nearly horizontal than vertical. In FIG. 2, W indicates the width of this housing cross-section at an example height. Also at each location along the path, there is a flow cross-section defined as the housing cross-section at a given height less the minimum cross-section of any components in the flow path at that height. "Minimum cross-section" refers to the horizontal cross-section of a rotatable component when the housing 16 is vertical and that rotatable component is rotated to present the least cross-section blocking flow. For example, in the case of the feed roller 24, this would be the cross-section of the roller having a diameter D and would not include the extent of the blades 42. Thus the flow cross-section defines the maximum cross-section of the flow path at a given height within the housing. In an embodiment, the feed roller 24 is a component within the housing whose cross-sectional area is subtracted from the housing cross-section to calculate the flow cross-section at a height containing a portion of the feed roller. In FIG. 2, D indicates the external diameter of the feed roller cross-section, neglecting the blades of the feed roller. In particular embodiments, the diameter D of the feed roller is at least 70% of the housing cross-section or width at the same height, at least 80% in some embodiments, or at least 90% in some embodiments.

The feed roller 24 may rotate in the direction shown in FIG. 2, or it may rotate in the opposite direction. The direction of rotation of the feed roller 24 may be reversed in order to dislodge material from the feed roller. The commutator 26 may rotate in the direction shown in FIG. 2, or it may rotate in the opposite direction. The feed roller 24 and the commutator 26 may rotate in the same or opposing directions.

Figure 8:
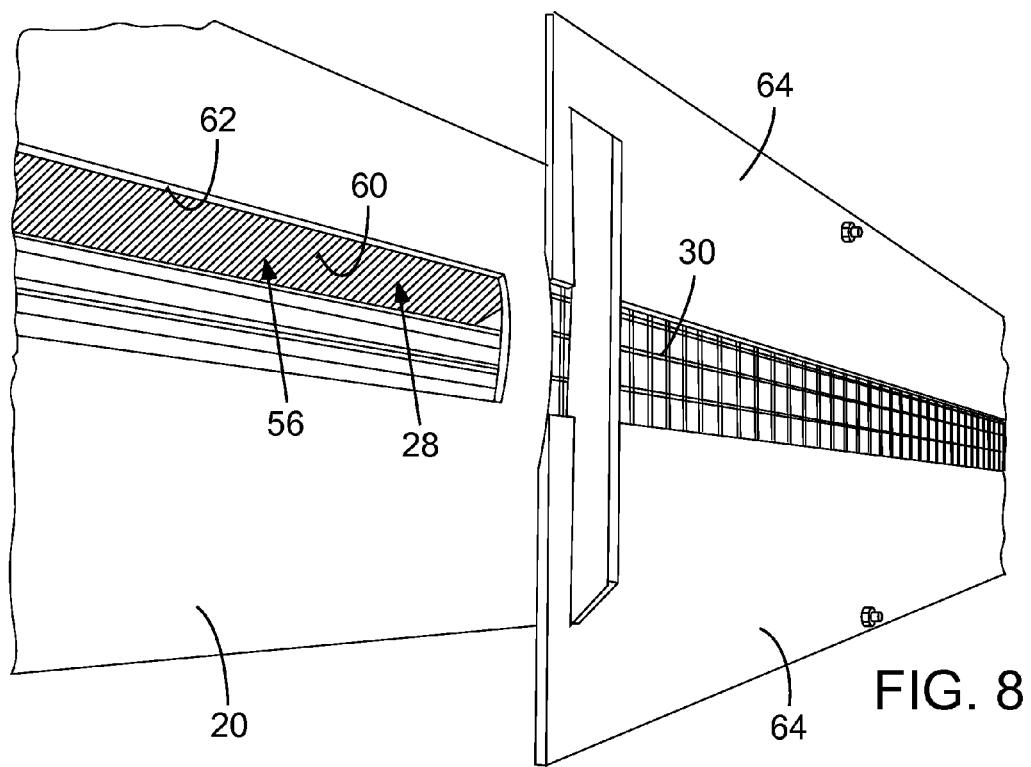
FIG. 8 is an enlarged perspective view showing a portion of the underside of the dispensing apparatus including a perforated cover comprising a screen.
Figure 10:
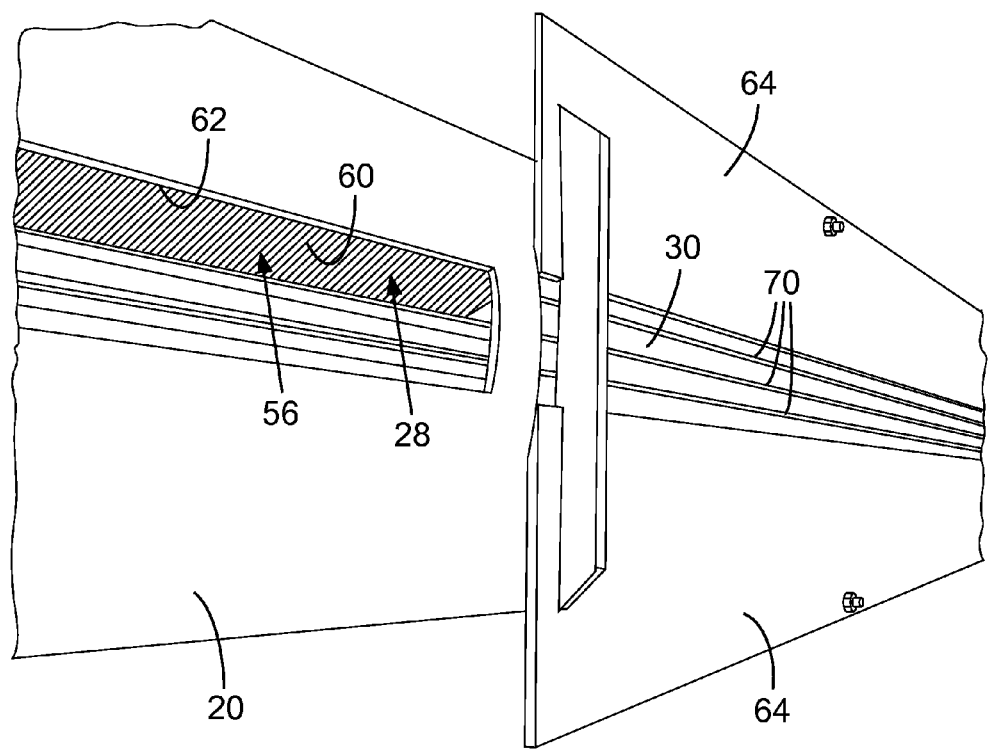
FIG. 10 is a view similar to FIG. 8 showing a perforated cover comprising a plurality of elongated bars.

The lower housing portion 20 houses an applicator 28 that is configured to sweep material across a perforated cover 30, which in an embodiment may be a screen as in FIG. 8 or in another embodiment may be a plurality of elongated elements, for example bars, forming a grill as in FIG. 10, at least partially covering an outlet opening 62 at the bottom of the housing 16. The term "perforated cover" as used herein includes a cover comprising a plurality of openings or apertures, such as in the form of a screen (e.g., a wire screen), a sheet of material formed with a plurality of openings (e.g., a sheet of metal with openings formed therein), or a piece of grating (e.g., a section of expanded metal). The perforated cover can also comprise a plurality of elongated slots, such as in a grill. In any case, the configuration of the perforated cover may be comprised of wire as in a screen or adaptations of a screen or it may be comprised of bars as in a grill or adaptions of a grill. The material of these wires or bars may be metal or plastic or another material able to withstand flow through the dispensing apparatus and desirably comprises a suitable food grade material if the dispensing apparatus is used to dispense food stuff. Additionally, in the case of elongated slots, the long axis of slots may parallel the long axis of the outlet opening (perpendicular to the width W of the housing), as in FIG. 10, or shorter slots instead may parallel the short axis of the outlet opening (parallel to the width W of the housing). The action of the applicator 28 sweeping material across the perforated cover 30 further breaks up the material and causes agglomerates of a predetermined size to be displaced through the perforated cover 30, out the outlet opening 62, and dispensed evenly across the conveyor surface.

The applicator 28 may rotate in the direction shown in FIG. 2, or it may rotate in the opposite direction. The applicator 28 and the commutator 26 may rotate in the same or opposing directions.

Referring again to FIG. 1, the upper housing 18 can be formed from a suitable plastic, such as HDPE (high-density polyethylene) or UHMW (ultra-high-molecular-weight polyethylene), or a suitable metal, such as stainless steel. The lower housing 20 can be formed from a section of PVC pipe. In alternative embodiments, the entire housing 16, including the upper and lower housing portions, can be fabricated from stainless steel.

Figure 3:
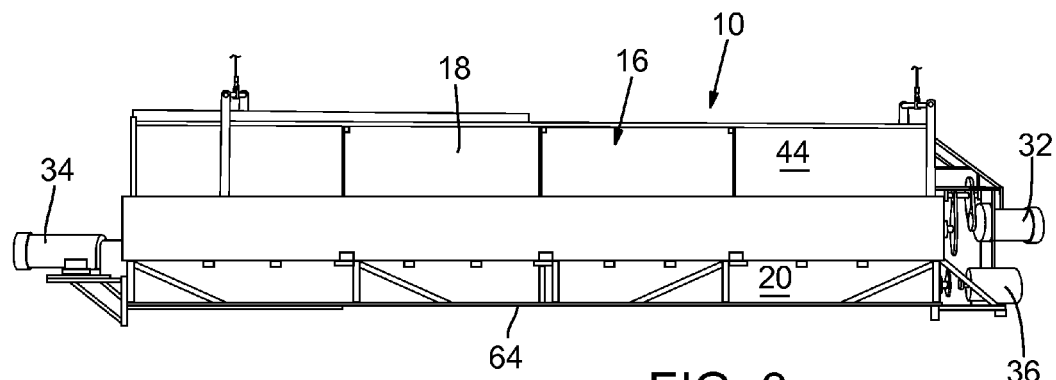
FIG. 3 is a rear elevation view of the dispensing apparatus of FIG. 1.
Figure 4:
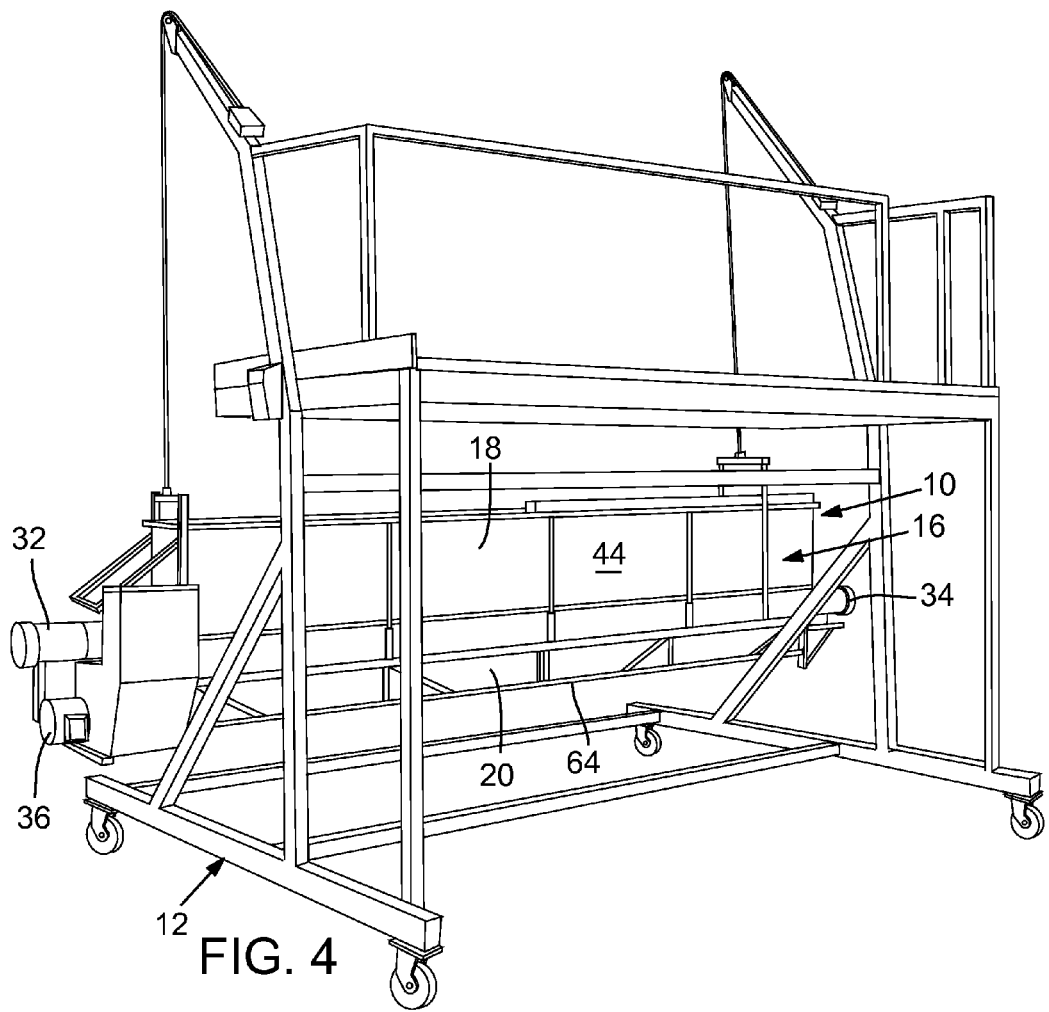
FIG. 4 is a rear perspective view of the dispensing apparatus of FIG. 1.

As best shown in FIGS. 3 and 4, each of the feed roller 24, commutator 26, and applicator 28 can be driven by a respective motor or other power source. In the illustrated embodiment, for example, the feed roller 24 is operatively connected to a first motor 32, the commutator 26 is operatively connected to a second motor 34, and the applicator 28 is operatively connected to a third motor 36. The feed roller 24 is rotated at a predetermined speed to achieve a desired thickness of product dispensed onto the conveyor 14. The commutator 26 desirably is rotated at a much faster rate than the feed roller to ensure that agglomerates are adequately broken up or otherwise separated into smaller pieces before passing into the lower housing compartment containing the applicator. Desirably, the applicator 28 also is rotated at a much faster rate than the feed roller 24.

Figure 5:
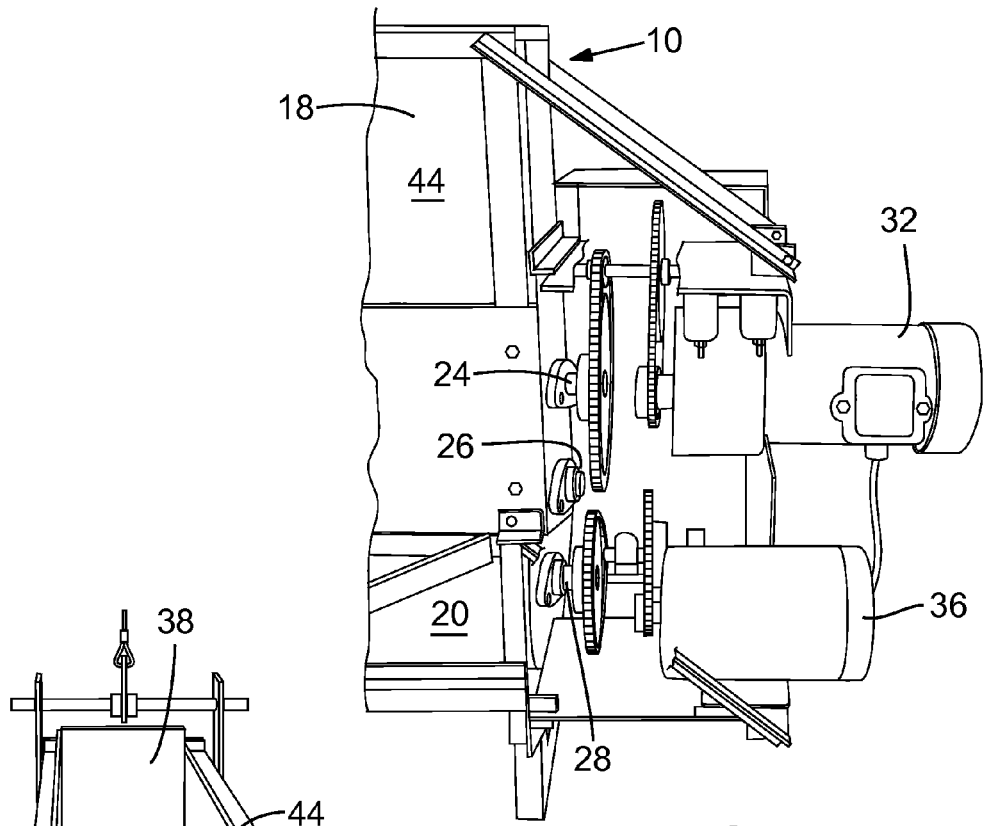
FIG. 5 is an enlarged view of two motors and respective drive assemblies of the dispensing apparatus of FIG. 1.

Various techniques or mechanisms can be used to transmit rotational movement of the motors to the feed roller, commutator, and applicator and to control the speed of the motors. As shown in FIG. 5, for example, chain and sprocket drives can be used to transmit rotational movement of the motors to the respective shafts of the feed roller, commutator, and applicator. The motors 32, 34, 36 can be in communication with a controller (not shown) that is operable to increase and decrease the speed of each of the motors. For example, in order to increase the thickness of the layer of material dispensed onto the conveyor 14, the controller can be operated to increase the speed of the motors and therefore the throughput of the dispensing apparatus.

In particular embodiments, the feed roller 24 can be operated at a speed in a range of about 0.3 rpm to about 0.9 rpm, with 0.6 rpm being a specific example. The commutator 26 can be operated at a speed in a range of about 500 rpm to about 1000 rpm, with about 750 rpm being a specific example. The applicator 28 can be operated at a speed in a range of about 120 rpm to about 215 rpm, with about 180 rpm being a specific example. The speeds of the feed roller, commutator, and/or the applicator can be greater or less than the specified ranges, depending on the particular application.

Figure 6:
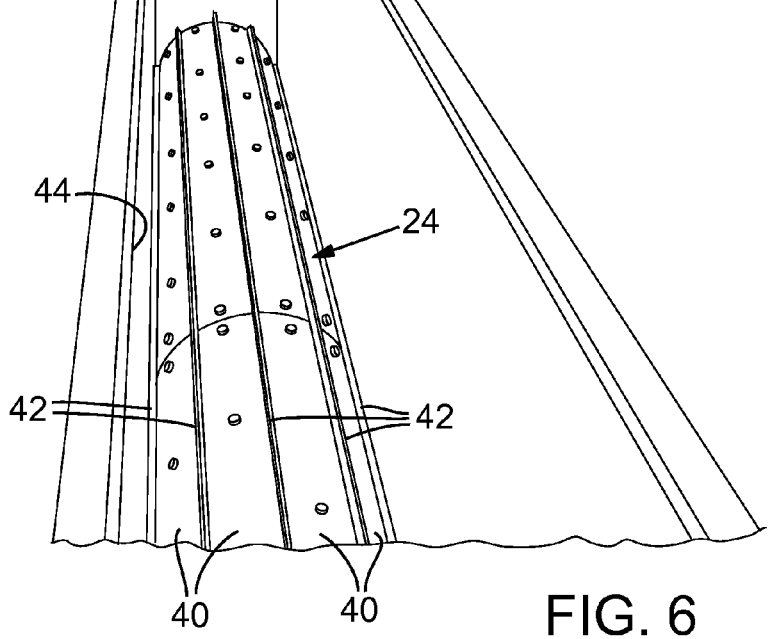
FIG. 6 shows the inside of the dispensing apparatus, as viewed through the inlet opening at the top of the dispensing apparatus.
Figure 7:
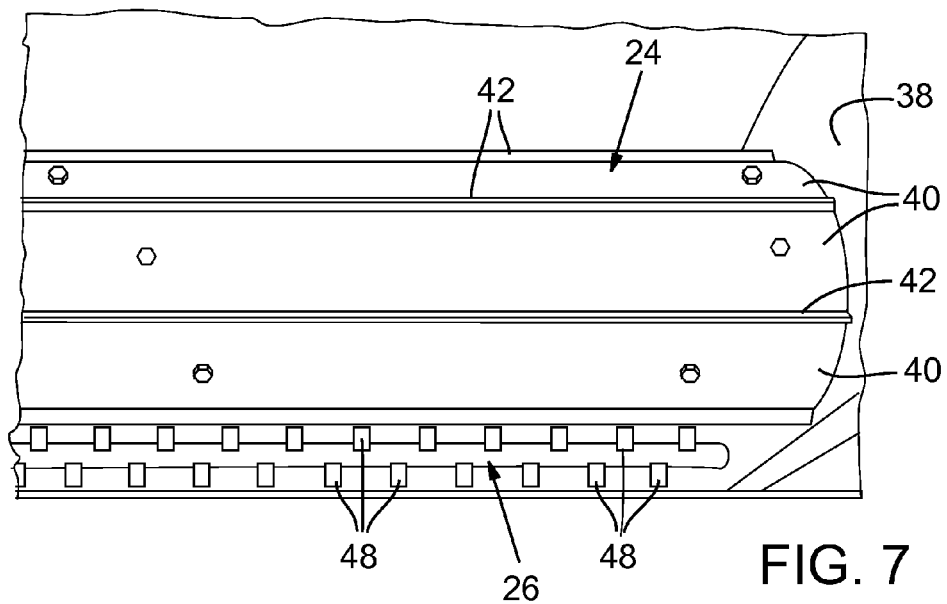
FIG. 7 is an enlarged perspective view showing a portion of the feed roller and commutator of the dispensing apparatus, as viewed through the inlet opening of the dispensing apparatus.

Referring to FIGS. 2 and 6-7, the feed roller 24 comprises a shaft 46 (FIG. 2), the opposite ends of which are mounted for rotational movement to the end walls 38 of the upper housing portion 18 (FIG. 6). One end of the shaft 46 is coupled to the first motor 32. The feed roller 24 can comprise a plurality of axially extending slats 40 that are secured to the shaft and a plurality of angularly spaced paddles, or blades, 42 positioned between adjacent slats 40 and extending radially outwardly therefrom. In the illustrated embodiment, the slats 40 are formed from sections of PVC pipe that are secured to the shaft, and the blades 42 are made of stainless steel.

In an embodiment, the blades 42 desirably extend uninterrupted in the axial direction substantially the entire length of the feed roller and radially a distance that forms a tight clearance with respect to the side walls 44 of the upper housing portion 18.

In an embodiment, the blades 42 are sized such that they desirably do not contact the side walls 44 but prevent or minimize product from flowing unregulated between the ends of the blades and the inner surfaces of the side walls. Material to be dispensed that is introduced into the upper housing portion 18 collects on top of the feed roller 24, which when rotated allows the material to pass to the lower portion of the upper housing in a controlled manner at a predetermined rate.

In another embodiment, the blades 42 may be configured so as to be flexible and long enough to contact and scrape the inner surface of the upper housing 18. The blades thus wipe material past and off this inner surface. In such an embodiment, the blades 42 can be made of a flexible food grade plastic, rubber or any suitable material or synthetic elastomer.

Material that contains moisture tends to agglomerate between the blades 42 of the feed roller and against the adjacent surfaces of the housing. The commutator 26 assists in breaking up the agglomerate before passing into the lower housing portion 20.

The commutator 26 can comprise a shaft 47 and a plurality of blades 48 extending radially outwardly from the shaft 47. The opposite ends of the shaft 47 are mounted for rotational movement to the end walls 38 of the upper housing portion 18. One end of the shaft 47 is coupled to the second motor 34. As best shown in FIGS. 2 and 7, the blades 48 desirably are arranged in multiple rows that extend along the length of the shaft. Each row includes a plurality of blades 48 that are spaced apart from each other along the length of the shaft. Each row of blades is angularly spaced (rotationally offset) from an adjacent row of blades. Moreover, each blade 48 can be offset in the axial direction with respect to the closest blades in the adjacent rows. The shaft 47 and the blades 48 can be made of stainless steel, plastic, rubber, or other suitable materials. As depicted in FIG. 2, the commutator 26 desirably is positioned such that the blades 48 can extend to just below without contacting the blades 42 of the feed roller to assist in removing material from the feed roller.

In alternative embodiments, the commutator 26 can be positioned closer to the feed roller 24 to contact the blades 42 and/or slats 40 of the feed roller during operation. In such embodiments, the commutator 26 can have blades 48 made of a food grade plastic or rubber or the blades can be replaced with flexible bristles that are positioned to swipe material off the surface of the feed roller 24. In addition, an optional vibrating device can be mounted on the housing proximate the location of the commutator to help dislodge material that adheres to the feed roller 24 or inner surfaces of the housing side walls 44.

Various factors can affect material adhering to the feed roller 24 and subsequent dislodging of that material. Some factors relate to properties of the material being dispensed. These material-related factors include but are not limited to whether that material is wet, dry, fine, coarse, hot, cold, oily, not oily, having glutinous or other adhesive composition or not, and further including gradations in between these opposing and interrelated descriptions.

Other factors relate to the interaction of the material with the dispensing apparatus, its components, and especially the feed roller and the housing. These apparatus-related factors include the speed of rotation of the feed roller, the composition of the surfaces of the feed roller, for example whether presenting a food grade rubber, plastic, or metal surface. Also the dimensions and proportions of the dispensing apparatus 10 play a role. These dimensions and proportions include the size of the free spaces above and below the feed roller within the upper housing 18, through which material moves, and, especially the size of the intermittent spaces defined by the passing of adjacent feed roller blades 42 near the inner surface of the housing 16. Such spaces are intermittently enclosed on two sides between the housing and the outer cylindrical surface of the feed roller (of diameter D, excluding the blades) and on two sides by the surfaces of the adjacent blades. These spaces are smaller in a circumferential direction when the blades are in closer proximity around the circumference of the feed roller. And these spaces are especially smaller when the blades are shorter along the radial dimension of the feed roller, and the outer surface of the feed roller, excluding the blades, is greater in diameter D and in closer proximity to the housing of width W. This is to say that these spaces are smaller when D is closer in size to W in FIG. 2. The volume of these spaces is directly related to the flow cross-section described above. The diameter D of the feed roller can be varied, depending on the material to be dispensed, by adding additional slats 40 between adjacent blades 42 to increase the diameter D and decrease the size of the "feed compartments" (the spaces defined between adjacent pairs of blades 42, the inner surface of the housing, and the outer surfaces of slats 40). Conversely, slats 40 can be removed, or replaced with thinner slats 40 to increase the size of the feed compartments.

Normally the outer ends of the blades, at the maximum radius of the feed roller, are designed to pass in close proximity to the housing. Depending then on the volume of these spaces, the speeds of rotation and configuration of the various components of the dispensing apparatus, the properties for material being dispensed, and the rate of introduction of material into the apparatus, material may be trapped more tightly in these spaces and/or may tend to adhere more to the feed roller, including after the blades move away from the housing.

In an embodiment, the apparatus may not be symmetrical from left to right across FIG. 2. The feed roller may not be exactly centered, or the angle of the sides of the housing may not be the same on both sides of FIG. 2. In such an embodiment, the spaces described above may be larger on one side relative to the other side due to the sizes and proximities described above being different on one side relative to the other side. In such an embodiment, or for other reasons creating asymmetry, operating the feed roller with one direction of rotation or the other may advantageously increase or decrease the extent to which material adheres to the feed roller as the material flows through one asymmetric side or the other.

Separately, changing the direction of rotation of any of the rotating components during operation may dynamically and advantageously increase or decrease the extent to which material adheres to that component or other components, as the material flows through the apparatus. This simply may be due to the mechanical shock of changing the direction of rotation, or this may be due to the reversal of any pattern of distribution of the material that resulted from the preceding direction of rotation.

In an embodiment, an advantageous mode of operation of the commutator may be choke feeding in which sizes, proximities, directions, and speeds of components of the apparatus are set so that material arrives in intermittent groups or clusters at the commutator, allowing the commutator to fractionate and transport material for a period of time and then to rotate relatively cleanly or unloaded for a period of time, none the less resulting in a more uniform final dispensing of material from the apparatus.

The side walls 44 of the upper housing portion 18 can have lower portions 66 that curve inwardly towards each other and define an outlet opening, or transfer opening, 68 below the commutator 26. The curved side wall portions 66 help direct material through the opening 68 into the lower housing portion 20.

In another embodiment, the commutator 26 may be positioned below the transfer opening 62 so that the transfer opening exits above and directs the flow of material to the commutator. This may be advantageous when the material is less adherent to the feed roller 24 but still requires fractionation. In this embodiment, the lower housing 20 may be enlarged in the vertical direction to accommodate the commutator.

In another embodiment, the dispensing apparatus 10 may comprise two commutators. A first commutator 26 is configured and positioned as shown in FIGS. 2 and 7. A second commutator is configured as described previously for the single commutator but positioned below the transfer opening as described above. This may be advantageous when the material is partially adherent to the feed roller 24 and still requires fractionation. In this embodiment, the lower housing 20 may be enlarged in the vertical direction to accommodate the additional commutator. The second commutator may be driven by the same motor as the first commutator or may be driven by a dedicated motor at the same or different speeds and/or directions than the first commutator. The mechanism for linking the second commutator to its drive motor and the speed and direction of rotation would be similar to that described for the first commutator-motor pair.

Figure 9:
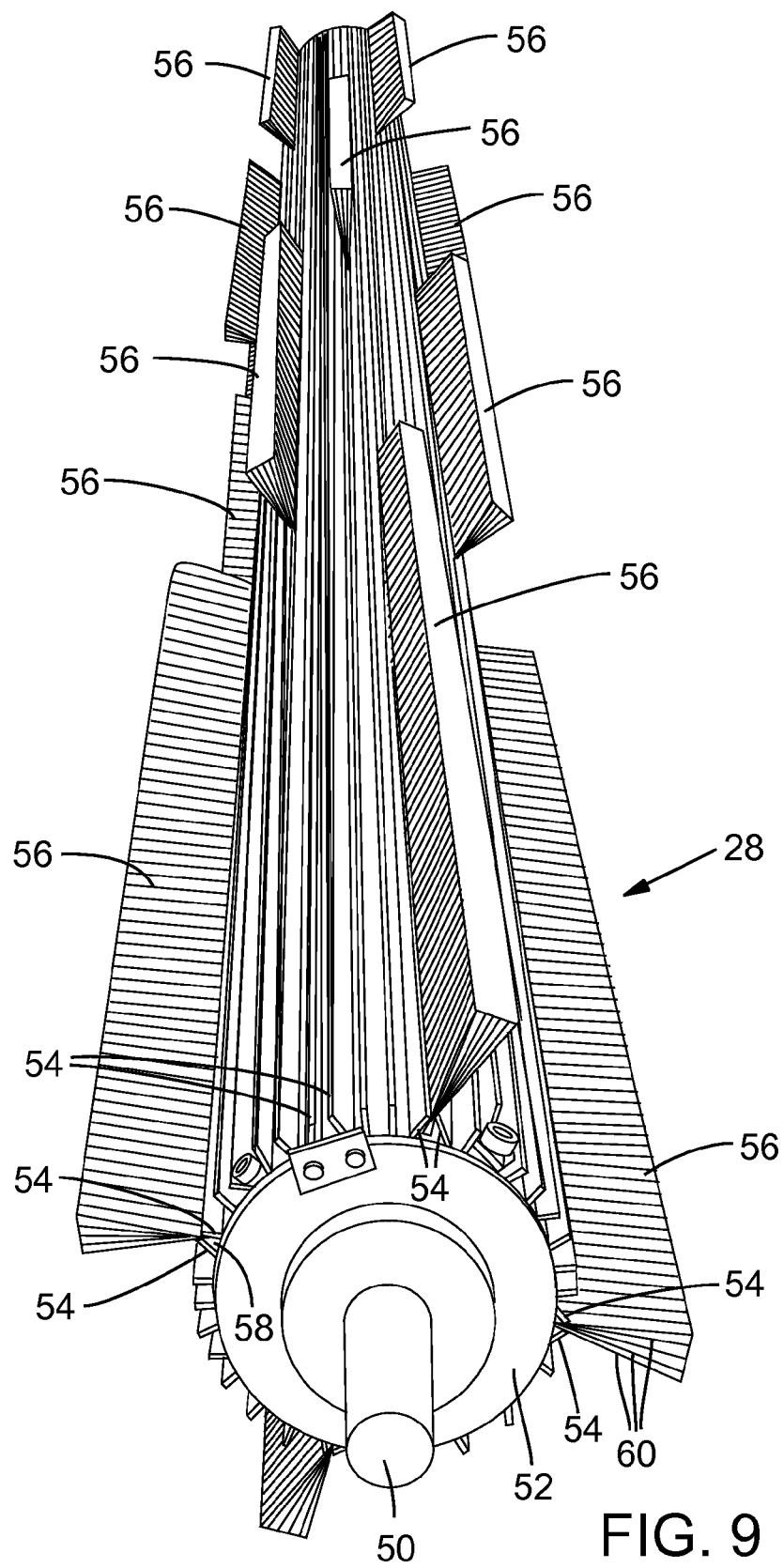
FIG. 9 is a perspective view showing the applicator of the dispensing apparatus.

Referring to FIG. 9, the applicator 28 can comprise a substantially cylindrical shaft 50 that supports an outer housing, or hub, 52, creating a substantially cylindrical shape. The opposite ends of the shaft 50 are mounted for rotational movement to the end walls of the lower housing portion 20. One end of the shaft 50 is coupled to the third motor 36. The housing 52 comprises a plurality of protrusions 54. The protrusions 54 extend radially outwardly from the outer surface of the housing 52 and axially along the length of the housing 52. Spaces are defined between adjacent protrusions for mounting multiple brushes 56 to the housing. Each brush 56 can comprise a plurality of food grade flexible bristles 60 mounted on a spline 58. To secure a brush 56 to the housing, the spline 58 is placed between two protrusions 54, which can then be bent towards each other to capture the spline between the two protrusions. The lower portion of the lower housing portion 20 can be curved so that the bristles 60 can contact the adjacent inner surfaces and sweep material off of those surfaces and across and through the perforated cover 30.

As can be seen in FIG. 9, the brushes 56 can be positioned at various locations on the housing 52. Although not required, each brush 56 in the illustrated embodiment extends about ¼ the length of the applicator. The brushes 56 can be arranged in four sets of brushes positioned end-to-end along the length of the housing 52. Each set can comprise, for example, four angularly spaced brushes. The brushes 56 of each set can be rotationally offset from the brushes of an adjacent set of brushes. The bristles 60 can comprise strands of food grade plastic, such as HDPE or UHMW.

Referring now to FIG. 8, the lower housing portion 20 can be formed with an outlet opening 62 that extends longitudinally along the lower housing portion at a location underneath the applicator 28. The opening 62 desirably is covered with a perforated cover 30 that cooperates with the applicator 28 to break the agglomerates as they pass through the opening 62. In the illustrated embodiment, the opening 62 does not extend uninterrupted along the length of the lower housing portion and instead can include multiple openings spaced along the length of the lower housing portion, each of which is covered by a respective perforated cover 30. For purposes of illustration, one of the perforated covers 30 is removed from the lower housing portion in the view shown in FIG. 8 to show a brush 56 positioned near a respective opening 62. Each perforated cover 30 can be mounted on a perforated cover support comprising, for example, plates 64 that are configured to mount the perforated cover directly below a respective opening 62. Utilizing multiple perforated covers 30 placed under respective openings 62 facilitates cleaning and removal of material that becomes clogged at locations along the length of the lower housing portion 20. In an alternative embodiment, the lower housing portion 20 can be formed with a single uninterrupted opening 62 below the applicator and a single perforated cover positioned to cover the opening 62.

Figure 2A:
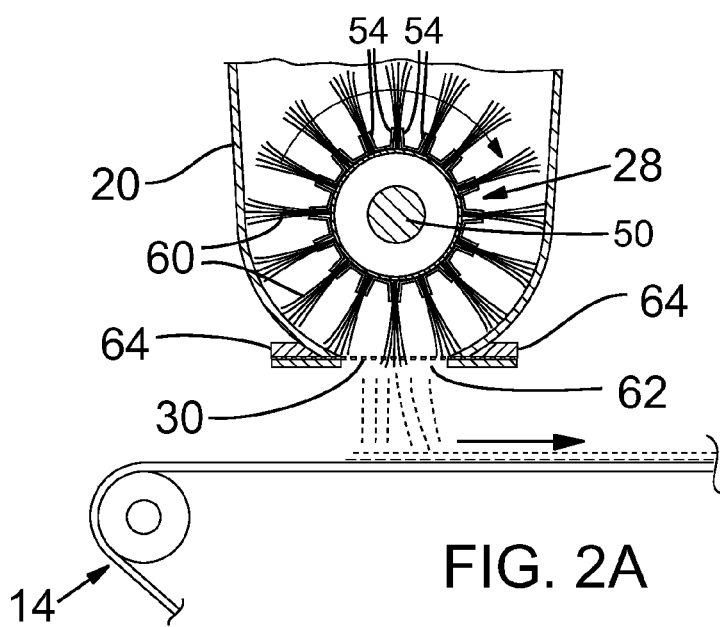
FIG. 2A is an enlarged view of a portion of FIG. 2.

As shown in FIGS. 2 and 2A, the bristles 60 desirably are sized such that they extend through the openings in the perforated cover 30 to ensure that product is scraped or swept against the perforated cover as the product is dispensed through the outlet opening 62 and to minimize build-up of product on the perforated cover. In particular embodiments, for example, the bristles 60 can be sized such that their end portions extend about ⅛ inch to about ¼ inch past the perforated cover 30. In other particular embodiments, the bristles 60 desirably are sized such that they extend only to the upper surface of the perforated cover 30.

In addition to changing the length of the bristles 60, additional particular embodiments include changing the positioning of the applicator 28 relative to the perforated cover 30 to control the interaction of the bristles 60 with the perforated cover 30 while independently controlling bristle length. Thus, it may be desirable to have shorter or longer bristles, independent of the interaction between the bristles 60 and the perforated cover 30. This might be the case for example in additionally and independently controlling the interactions of the bristles 60 with either the lower housing 20 inner surface or with the commutator 26.

The size of the openings in the perforated cover can depend on various factors, including the moisture content of the product being dispensed and the desired maximum agglomerate size within the product. In certain embodiments, the perforated cover 30 can have openings in the range of about 1/8 inch to about 1/2 inch, with perforated cover openings of about 1/8 inch, 1/4 inch, and 1/2 inch being specific examples.

An additional factor in selecting bristle 60 length, and in positioning the commutator 26 and the applicator 28 relative to each other, is whether contact is desired between the commutator 26 and the applicator 28. In one embodiment, the applicator 28 does not contact the commutator 26. See FIG. 2. In another embodiment, longer bristles 60 or more proximate positioning of the commutator 26 and applicator 28, allow the bristles 60 of the applicator 28 to contact the commutator 26 or its blades 48. This allows the applicator 28 to assist in dislodging material from the commutator 26, and this may be desirable in dispensing materials having a greater tendency to adhere to the commutator 26.

Drying certain types of fruit pulp may require the product to be conveyed through the dryer multiple times before it is adequately dried. With each pass through the dryer, the fruit pulp becomes more tacky and paste-like in consistency and less capable of forming an even layer on the conveyor. Thus, as the product loses moisture, it may be desirable to decrease the size of the openings in the perforated covers 30 for subsequent passes through the dryer to produce smaller agglomerates that are dispensed onto the conveyor.

In a specific implementation for drying fruit pulp, the fruit pulp is first ground into pieces about 1/2 inch or less in size, and preferably less than about 1/4 inch in size. The ground product is transferred into the dispensing apparatus 10, such as by an auger that pushes the product into the dispensing apparatus. The dispensing apparatus is initially equipped with screens 30 having 1/2-inch square openings. The dispensing apparatus 10 dispenses the product onto the conveyor 14, which conveys the product through the dryer. The product can be subjected to multiple passes through the dryer until all or substantially all moisture is removed from the product. After each pass through the dryer, the product is transferred back into the dispensing apparatus 10, which again dispenses the product onto the conveyor. After about the second pass through the dryer, the screens 30 can be replaced with screens having smaller openings, such as screens with 1/4-inch openings.

For dispensing fine particles or moist or dry powders (such as botanical powders), the dispensing apparatus can be equipped with perforated covers comprising screens having 1/8-inch openings. For dispensing relatively large particles (for example, particles greater than 1/2 inch, such as pieces of onion), the perforated covers can be one or more elongated bars or rods 70 that extend along the long dimension of the lower housing portion directly below the outlet opening 62 (as shown in FIG. 10). When there is a plurality of bars, they can be spaced apart from each other a predetermined distance to allow pieces of material to fall through the gaps between the bars and onto the conveyor surface.

As noted above, the drying apparatus 8 in some applications is not necessarily used for drying moisture-laden product but instead functions as a heating apparatus that heats product to a temperature sufficient to sterilize the product. In this regard, the dispensing apparatus 10 can also be used to handle and dispense relatively dry material onto the conveyor 14 for sterilization. Some examples of such materials include different parts of a plant, such as leaves and roots, which can be ground into smaller pieces or into a powder before being introduced into the dispensing apparatus.

In view of the many possible embodiments to which the principles of the disclosed invention may be applied, it should be recognized that the illustrated embodiments are only preferred examples of the invention and should not be taken as limiting the scope of the invention. We therefore claim as our invention all modifications and variations that fall within the scope of the following claims.

We claim:

1. An apparatus for dispensing material, said apparatus comprising:
    a housing comprising opposing side walls, inlet and outlet openings and a path extending from the inlet opening to the outlet opening through which material to be dispensed can travel;
    a stationary perforated cover at least partially covering the outlet opening;
    a rotatable feed roller disposed within the housing and having a plurality of blades extending axially along the length of the feed roller and radially outward to inhibit material from flowing unregulated between the outer ends of the blades and the inner surfaces of the housing side walls; and
    a rotatable applicator disposed within the housing below the feed roller and configured to dispense material through the perforated cover;
    wherein the applicator comprises one or more brushes, each comprising a plurality of flexible bristles;
    wherein the housing side walls have lower portions that curve underneath opposite sides of the applicator and have respective lower longitudinal edges spaced apart from each other so as to define the outlet opening, and the one or more brushes are configured to contact the inner surfaces of the lower portions of the housing side walls from the lower longitudinal edges to respective locations on the inner surfaces of the lower portions at the height of a central rotation axis of the applicator.

2. The apparatus of claim 1, wherein the perforated cover extends over the entire extent of the outlet opening.

3. The apparatus of claim 1, wherein the applicator is configured and positioned to contact and sweep material across the perforated cover.

4. The apparatus of claim 1, wherein the perforated cover is a screen.

5. The apparatus of claim 1, wherein the applicator comprises one or more brushes, each comprising a plurality of flexible bristles.

6. The apparatus of claim 5, wherein at least a portion of the bristles extend through openings in the perforated cover when the applicator is rotated relative to the perforated cover.

7. The apparatus of claim 6, wherein the at least a portion of bristles that extend through the perforated cover have end portions that extend past the perforated cover.

8. The apparatus of claim 5, wherein the housing side walls have lower portions that curve underneath opposite sides of the applicator and have respective lower longitudinal edges spaced apart from each other so as to define the outlet opening, and the one or more brushes are configured to contact the inner surfaces of the lower portions of the housing side walls from the lower longitudinal edges to respective locations on the inner surfaces of the lower portions at the height of a central rotation axis of the applicator.

9. The apparatus of claim 1, further comprising means for fractionating the material as it flows through the housing.

10. The apparatus of claim 9, wherein the means for fractionating comprises a rotatable commutator disposed within the housing.

11. The apparatus of claim 10, wherein the rotatable commutator is positioned below the feed roller and above the applicator.

12. The apparatus of claim 11, wherein the housing comprises an upper housing and a lower housing, the upper housing comprising the inlet opening, the lower housing comprising the outlet opening, the upper housing additionally comprising a transfer opening at or near a lower end thereof and opening into the lower housing, and wherein the path extends from the inlet opening through the transfer opening and to the outlet opening, and wherein the transfer opening is smaller than a width of the lower housing.

13. The apparatus of claim 1, wherein the housing additionally comprises a flow cross-section and a housing cross-section, both at a same height within the housing and wherein the flow cross-section is smaller than the housing cross-section.

14. The apparatus of claim 1, wherein each blade of the feed roller extends axially the entire length of the feed roller from one end wall of the housing to an opposing end wall of the housing.

15. The apparatus of claim 1, wherein the blades of the feed roller have a length in the radial direction sufficient to contact the inner surfaces of the housing side walls upon rotation of the feed roller.

16. The apparatus of claim 1, further comprising a vibrating device mounted on the housing to assist in removing material adhered to the feed roller or the inner surfaces of the housing side walls.

17. A method comprising:
  introducing material into a dispensing apparatus according to claim 1;
  dispensing the material from the dispensing apparatus through the perforated cover of the dispensing apparatus with the rotatable applicator within the housing, wherein the applicator brushes the material against the perforated cover; and
  rotating the feed roller to cause the material to pass through the housing from the feed roller to the applicator at a predetermined rate.

18. The method of claim 17, wherein the applicator comprises a plurality of flexible bristles that extend through the perforated cover as the applicator rotates relative to the perforated cover.

19. The method of claim 17, wherein the material comprises fruit or vegetable pulp.

20. The method of claim 19, wherein the material is dispensed onto a conveying surface and is conveyed through a drying apparatus that causes moisture to be removed from the material.

21. The method of claim 20, further comprising removing the material from the drying apparatus and reintroducing the material into the dispensing apparatus to dispense and convey the material through the drying apparatus at least one additional time.

22. The method of claim 21, wherein prior to reintroducing the material back into the dispensing apparatus, the perforated cover is removed and replaced with another perforated cover having relatively smaller openings than the removed perforated cover.

23. The method of claim 17, wherein the applicator rotates at a faster speed than the feed roller.

24. The method of claim 17, wherein the applicator rotates at a faster speed than the feed roller, and the commutator rotates at a faster speed than the applicator.

25. The method of claim 17, wherein the predetermined rate is determined at least in part by the rotation speed of the feed roller.

26. The method of claim 17, further comprising fractionating the material with a rotating commutator as the material flows from the feed roller to the applicator.

27. A system for drying material, said system comprising:
  a dispensing apparatus according to claim 1;
  a conveying apparatus positioned to receive material dispensed from the dispensing apparatus; and
  a drying apparatus configured to remove moisture from material being conveyed on the conveying apparatus.

28. The system of claim 27, wherein the applicator is configured and positioned to sweep material across the perforated cover.

29. The system of claim 27, wherein the perforated cover is a screen.

30. The system of claim 27, wherein the applicator comprises a plurality of flexible bristles that can brush against the perforated cover when the applicator is rotated.

31. The system of claim 30, wherein at least some of the bristles extend through the perforated cover when the applicator is rotated.

32. An apparatus for dispensing material, said apparatus comprising:
  a housing comprising opposing side walls, inlet and outlet openings and a path extending from the inlet opening to the outlet opening through which material to be dispensed can travel;
  a screen extending over the outlet opening;
  a rotatable applicator disposed within the housing and comprising a plurality of brushes each with plurality of flexible bristles, wherein the rotatable applicator is configured and positioned to sweep material across, thereby dispensing material through, the screen;
  wherein at least a portion of the bristles extend through openings in the screen when the applicator is rotated relative to the screen;
  wherein the at least a portion of bristles that extend through the screen have end portions that extend past the screen;
  a feed roller disposed within the housing at a position above the applicator for regulating the amount of material flowing from the feed roller to the applicator, the feed roller having a plurality of blades extending axially along the length of the feed roller and radially outward to inhibit material from flowing unregulated between the outer ends of the blades and the inner surfaces of the housing side walls;
  a rotatable commutator disposed within the housing, below the feed roller, and above the applicator, for fractionating the material as it flows through the housing;
  the housing comprising an upper housing and a lower housing, the upper housing comprising the inlet opening, the lower housing comprising the outlet opening, the upper housing additionally comprising a transfer opening at or near a lower end thereof and opening into the lower housing, and wherein the path extends from the inlet opening through the transfer opening and to the outlet opening;

wherein the lower housing has lower side wall portions that curve underneath opposite sides of the applicator and respective lower longitudinal edges spaced apart from each other so as to define the outlet opening, and the plurality of brushes are configured to contact the inner surfaces of the lower side wall portions from the lower longitudinal edges to respective locations on the inner surfaces of the lower side wall portions at the height of a central rotation axis of the applicator.

\* \* \* \* \*